United States Patent
Oehlgrien et al.

(10) Patent No.: US 8,583,300 B2
(45) Date of Patent: Nov. 12, 2013

(54) AUTOMATIC STABILIZING UNIT FOR WATERCRAFTS

(75) Inventors: Ralf Oehlgrien, Gau-Bischofsheim (DE); Zhenfu Chen, Schwalbach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 480 days.

(21) Appl. No.: 12/530,337

(22) PCT Filed: Mar. 7, 2008

(86) PCT No.: PCT/EP2008/052795
§ 371 (c)(1),
(2), (4) Date: Dec. 2, 2009

(87) PCT Pub. No.: WO2008/110519
PCT Pub. Date: Sep. 18, 2008

(65) Prior Publication Data
US 2010/0094491 A1  Apr. 15, 2010

(30) Foreign Application Priority Data

Mar. 9, 2007  (DE) .......................... 10 2007 011 942
Mar. 7, 2008  (DE) .......................... 10 2008 013 212

(51) Int. Cl.
*B63H 25/00*  (2006.01)

(52) U.S. Cl.
USPC ............. 701/21; 114/275; 114/285; 440/61 T

(58) Field of Classification Search
USPC ................ 701/21; 114/1, 274, 275, 284, 285, 114/145 R; 440/53, 54, 55, 61 S, 61 T
See application file for complete search history.

(56) References Cited

U.S. PATENT DOCUMENTS

| | | | | | |
|---|---|---|---|---|---|
| 3,469,550 | A | * | 9/1969 | Priestley | 114/275 |
| 3,886,884 | A | * | 6/1975 | Stark et al. | 114/275 |
| 4,444,143 | A | * | 4/1984 | Tattersall et al. | 114/67 A |
| 4,749,926 | A | * | 6/1988 | Ontolchik | 318/588 |
| 4,769,773 | A | | 9/1988 | Shatto, Jr. | |
| 4,908,766 | A | * | 3/1990 | Takeuchi | 701/21 |
| 5,053,969 | A | * | 10/1991 | Booth | 701/11 |
| 5,058,520 | A | | 10/1991 | Fahrney | |
| 5,118,315 | A | | 6/1992 | Funami et al. | |
| 5,142,473 | A | | 8/1992 | Davis | |
| 5,352,137 | A | * | 10/1994 | Iwai et al. | 440/1 |

(Continued)

FOREIGN PATENT DOCUMENTS

| | | |
|---|---|---|
| DE | 38 03 942 C3 | 1/1997 |
| DE | 196 54 511 A1 | 7/1998 |
| DE | 198 02 354 A1 | 8/1999 |
| EP | 1 051 326 | 3/2004 |

*Primary Examiner* — Thomas Black
*Assistant Examiner* — Ce Li
(74) *Attorney, Agent, or Firm* — RatnerPrestia

(57) ABSTRACT

An automatic stabilization unit for watercraft such as boats, yachts and the like. In order to ensure stabilization of the watercraft with a high level of movement comfort at the same time over the entire speed range and in all water conditions, an electronic regulator is provided which stabilizes the water attitude of the watercraft during movement, while moving straight ahead and turning, as a function of the movement-situation-dependent rotation rates and longitudinal accelerations and/or lateral accelerations and/or vertical accelerations, using the actuating elements which are normally available in the watercraft, thus preventing or reducing to a minimum any stress on, damage to or danger to the boat, its occupants and the surrounding are thereof.

9 Claims, 7 Drawing Sheets

Lateral dynamics and roll angle

(56) References Cited

U.S. PATENT DOCUMENTS

| | | | |
|---|---|---|---|
| 5,448,963 A * | 9/1995 | Gallington | 114/274 |
| 5,474,012 A * | 12/1995 | Yamada et al. | 114/286 |
| 5,488,819 A * | 2/1996 | Aiyama | 56/12.1 |
| 5,488,919 A * | 2/1996 | Ferreiro et al. | 114/122 |
| 6,273,771 B1 * | 8/2001 | Buckley et al. | 440/84 |
| 6,325,684 B1 * | 12/2001 | Knight | 440/6 |
| 6,367,400 B1 | 4/2002 | Niggemann et al. | |
| 6,549,830 B2 * | 4/2003 | Harada et al. | 701/21 |
| 7,473,076 B2 * | 1/2009 | Rosenkranz et al. | 416/1 |
| 7,641,525 B2 * | 1/2010 | Morvillo | 440/42 |
| 7,702,431 B2 * | 4/2010 | Kaji | 701/21 |
| 2007/0068438 A1 * | 3/2007 | Mizutani | 114/144 R |
| 2007/0207683 A1 * | 9/2007 | Mizutani | 440/53 |
| 2008/0072811 A1 * | 3/2008 | Patterson | 114/274 |

\* cited by examiner

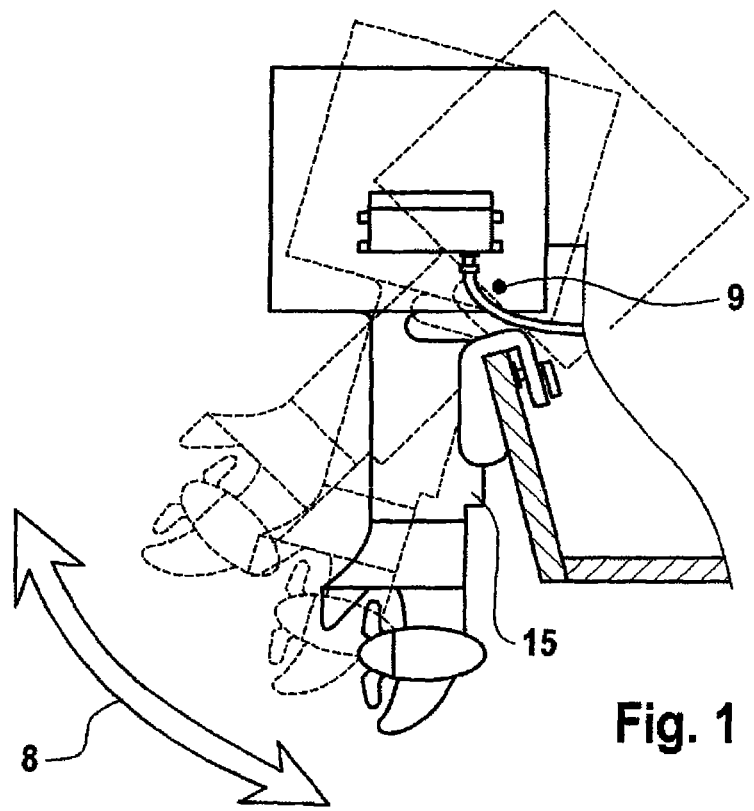
Fig. 1
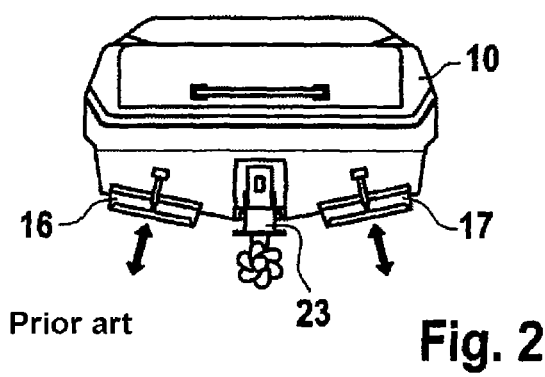
Prior art   Fig. 2

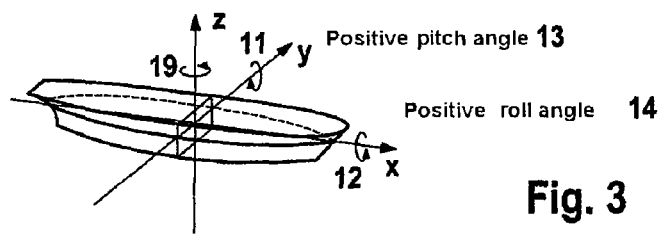
Fig. 3
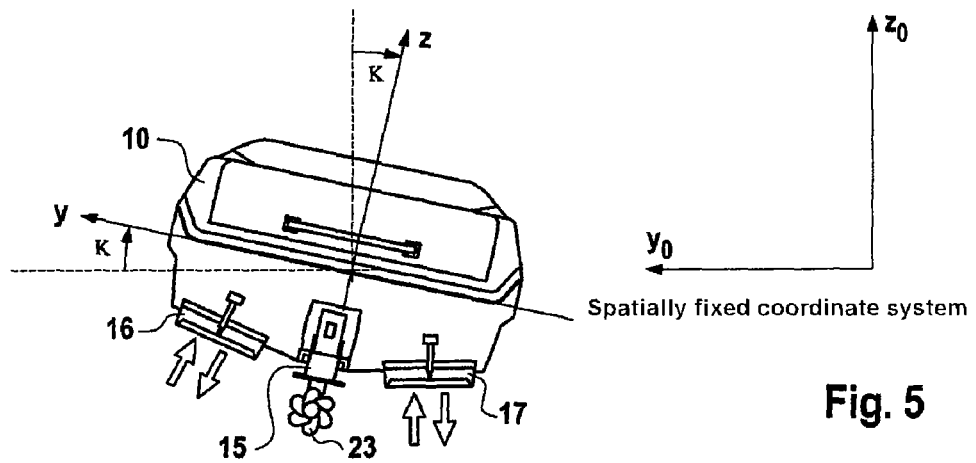
Fig. 4
Fig. 5

Definition of the angles on the horizontal plane

Spatially fixed coordinate system

α : Course angle [rad]
β : Drift angle [rad]
δ : Rudder angle [rad]
P : Model reference point [rad]
ψ : Lead angle [rad] - yaw angle
V : Velocity vector of P [m/s]

AUTOMATIC STABILIZING UNIT FOR WATERCRAFTS

CROSS REFERENCE TO RELATED APPLICATIONS

This application is the U.S. national phase application of PCT International Application No. PCT/EP2008/052795, filed Mar. 7, 2008, which claims priority to German Patent Application No. DE 10 2007 011 942.0, filed Mar. 9, 2007 and German Patent Application No. DE 10 2008 013 212.8, filed Mar. 7, 2008, the contents of such applications being incorporated by reference herein.

BACKGROUND OF THE INVENTION

1. Field of the Invention

The invention relates to an automatic stabilization unit for watercraft such as boats, yachts and the like.

2. Description of the Related Art

DE 38 03 942 C3 discloses an apparatus for influencing the water attitude of a boat which responds even at small trim or heel angles and in which the trim and the heel are controlled independently. In this case, when the watercraft is at an angle, the control device is intended to be activated directly in that a moving contact transmitter body applies control contacts as a result of the inclination of the watercraft. Control signals for application to the drives of trimming flaps are produced by means of the contact transmitter body, as a function of the central control switch. In the case of heel, the watercraft is automatically realigned irrespective of how the wind is blowing or how many people are sitting on one side. The control signals act on the propulsion motors of the starboard flaps and of the port flaps in the sense of opposing flap movements. In this case, the alignment is in each case relative to a single inclination plane. In order to trim the boat with reference to two mutually perpendicular inclination axes of a reference plane, the invention provides for inclined attitude compensation to be carried out by means of only that trimming flap which is diagonally opposite the deep point of the boat. The control switch which is used as a nominal value transmitter can in this case be aligned horizontally on two mutually perpendicular axes.

One known automatic trimming system for propulsion and flaps permanently compensates for the inclined attitude in the event of course changes, a side wind or movement of people on the watercraft, and automatically corrects the water attitude (automatic trimming system for propulsion and flaps, ACS, Mente Marine, P.O. Box 472, FIN-65101 Vaasa, Finland). Sensors are provided for this purpose, which identify the speed, the roll movements, the yaw and the pitch movement. A program corrects the water attitude of the boat while it is gliding, and ceases only when the boat changes to the displacement phase. Undershooting of the gliding speed is identified by means of the engine rotation speed, as determined by the sensor. In this case, the system is matched to the sea state. A different sea state is likewise identified by the system. In this case, when the water is smooth, the trimming system corrects more quickly than when the sea is rough. If the trimming system identifies turning by means of the yaw rate signal, then more extensive control action is actively prevented. Only when the boat is once again traveling straight ahead in a stable form is the trimming system switched on again.

The control signals emitted by the controllers for the trimming systems are used to control actuating elements, which are known per se, for the watercraft. FIG. 1 illustrates a longitudinal trimming device 15 which allows power trimming of the watercraft by means of outboard motors and a Z drive. For this purpose, the longitudinal propulsion unit 23 of the watercraft is pivoted about the bearing point 9 in the direction of the arrow 8. In addition, trimming flaps 16, 17 can be operated synchronously.

One known lateral trimming device may have the trimming flaps 16, 17 which are illustrated schematically in FIG. 2, can be operated electrically and/or hydraulically, and are operated asynchronously.

Furthermore, longitudinal propulsion devices 23, for example at least one propulsion motor, usually in the form of an outboard motor, Z drive, shaft drive, are provided (EP1051326B1). A lateral propulsion device, which is not illustrated in any more detail, may have a bow jet steering device and/or a stern jet steering device.

The invention is based on the object of improving an automatic stabilization unit for watercraft such as boats, yachts and the like, such that the watercraft can be stabilized in all movement situations.

The known stabilization unit described initially, "Attitude Correction Systems—ACS A+" from Mente-Marine, has two functional blocks, by means of which automated longitudinal-trim control and heel compensation can be carried out, in each case when moving straight ahead.

SUMMARY OF THE INVENTION

The invention avoids the restrictions of the known stabilization unit to control when moving straight ahead and comprises the provision of an electronic regulator which stabilizes the water attitude of the watercraft during movement, while moving straight ahead and turning, as a function of the movement-situation-dependent rotation rates and longitudinal accelerations and/or lateral accelerations and/or vertical accelerations, using the actuating elements which are normally available in the watercraft, so as to prevent or reduce to a minimum stress, damage or danger to the watercraft, its occupants and its surrounding area.

One substantial factor in this case is that an automatic stabilization unit for watercraft, such as boats, yachts, ships, has an electronic regulator for movement stabilization, to which the measured or calculated movement-situation-dependent rotation rates and accelerations (longitudinal, lateral, vertical) are made available as actual variables, and the regulator stabilizes the water attitude of a powered watercraft at all times while moving straight ahead and turning, as a function of calculated nominal variables.

Longitudinal and lateral trimming devices and/or longitudinal and lateral propulsion units are expediently provided as actuating elements.

The electronic regulator advantageously has a control unit, by means of which freely variable application-specific movement programs can be set by the operator. In this case, the control unit can advantageously be used to set at least the prior-configured movement programs ECO, HARBOR, TROLL, WAVE, CRUISING, SKI, for example with ECO supporting economic movement, and HARBOR supporting HARBOR entrance.

Furthermore, the electronic regulator receives further input signals which assist the helmsman in his responsibility for predictive operation and collision prevention. The further input signals to the regulator are produced by systems in or on the watercraft, whose output signals are made available for channel identification.

BRIEF DESCRIPTION OF THE DRAWINGS

One exemplary embodiment will be described in more detail in the following text, and is illustrated in the drawing, in which:

FIG. 1 shows a schematic illustration of a longitudinal trimming device, in particular of power trimming by means of outboard motors and a Z drive, FIG. 2 shows a schematic illustration of a lateral trimming device, in particular trimming flaps which can be operated electrically and/or hydraulically, FIG. 3 shows a schematic illustration of a vehicle-fixed coordinate system of a watercraft with the associated angles, FIG. 4 shows a schematic illustration of the roll angle in the vehicle-fixed coordinate system, FIG. 5 shows a schematic illustration of the associated spatially fixed coordinate system in FIG. 4.

DETAILED DESCRIPTION OF THE PREFERRED EMBODIMENT

Figure 6:
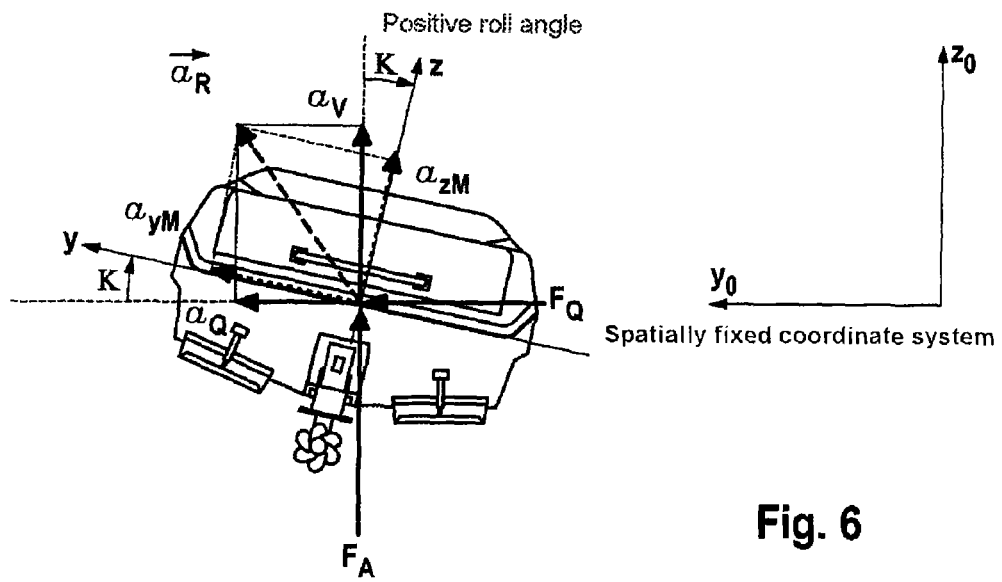
FIG. 6 shows an illustration of the relationship between the lateral dynamics and the roll angle.

1. General Definition of the Coordinate Systems of a Watercraft

If one considers a watercraft, for example a yacht or a boat, which is stationary, then three axes can be defined in a local orthogonal system:
Origin: the point at which the buoyancy force acts
x axis: the longitudinal axis
y axis: the lateral axis
z axis: the vertical, corresponding to the direction of the buoyancy force.

If these three axes are transferred to the watercraft illustrated in FIG. 3, the following two coordinate systems can be considered:

Spatially fixed coordinate system $x_0$-$y_0$-$z_0$ with the origin at the vehicle center of gravity or zero point, with the $z_0$ axis pointing vertically upwards, the $x_0$ axis pointing forwards in the direction of travel, and the $y_0$ axis lying on the horizontal plane and running at right angles to the $x_0$ axis; this points to the left in the direction of travel.

Vehicle-fixed coordinate system x-y-z with the origin at the vehicle center of gravity, with the z axis running at right angles to the vehicle floor plane upwards, with the x axis being parallel to the vehicle floor plane and pointing forwards in the direction of travel, and with the y axis being parallel to the vehicle floor plane and pointing to the left in the direction of travel.

The vehicle-fixed coordinate system x-y-z can be created by two rotations, which are carried out successively, with respect to the spatially fixed coordinate system $x_0$-$y_0$-$z_0$. Initially, the two coordinate systems are located one above the other (FIG. 3). The vehicle-fixed coordinate system x-y-z is then rotated about the $y_0$ axis in the positive direction (direction of the arrow 11) through the angle $\phi$. The x axis is therefore at the same angle $\phi$ to the $x_0$ axis. The angle $\phi$ is referred to as the pitch angle 13 of the watercraft 10. The vehicle-fixed coordinate system x-y-z is then rotated about the x axis (direction of the arrow 12) through an angle $\kappa$. The angle $\kappa$ illustrated in FIG. 4 is referred to as the roll angle 14. The spatially fixed coordinate system, indicated only schematically by dashed lines in FIG. 4, is illustrated separately in FIG. 5.

2. Movements of the Watercraft

When forces which are not vertical act on a watercraft, such as a ship or a boat, then the watercraft is moved; the floating watercraft 10 is a freely moving body with 6 degrees of freedom, and it can therefore carry out six different movements individually or combined:
Three translational:
in the direction of the x axis: (forwards, backwards)
in the direction of the y axis: (sideways)
in the direction of the z axis: (diving)
and three rotational:
rotation about the x axis: (heeling, rolling)
rotation about the y axis: (trimming, pitching)
rotation about the z axis: (rotation, yawing)

One simple example is forwards movement: when the longitudinal propulsion unit 23 is producing the force M in the negative x direction, then this results in forward movement.

3. Sensors and Measured Values

As FIGS. 6 to 9 and 11 show, three acceleration sensors 18, which are associated with the vehicle-fixed coordinate system x-y-z, are connected to the electronic regulator 20, which will be described in more detail later. The sensors 18 measure the corresponding three acceleration components $\alpha_{xM}$, $\alpha_{yM}$ and $\alpha_{zM}$. Three angular velocity sensors 18 are likewise connected to the electronic regulator 20, and are permanently associated with the vehicle-fixed coordinate system x-y-z. The sensors 18 measure the three angular velocities, as illustrated in FIG. 3, about the x, y and z axes. These are the roll rate $\dot{\kappa}$, pitch rate $\dot{\phi}$ and the yaw rate $\dot{\psi}$.

The invention also covers embodiments in which the accelerations and/or rates and velocities determined by the sensors 18 are also calculated or estimated from other signals, using models.

3.1 Roll Angle of the Watercraft (Roll Angle, Heel Angle)

The roll angle $\kappa$ cannot be measured directly. The acceleration components in the y-z plane are observed in order to derive the roll angle $\kappa$. When turning, there are two acceleration components on the y-z plane $\alpha_Q$ and $\alpha_v$. In this case, $\alpha_Q$ is the lateral acceleration of the watercraft 10 in the Y0 direction, and $\alpha_v$ is the vertical acceleration in the Z0 direction. $\alpha_Q$ is approximately identical to the centripetal acceleration.

$$\alpha_Q = V\dot{\alpha} = V\dot{\psi} - V\dot{\beta} \approx V\dot{\psi} \quad (20)$$

where V=the velocity in the spatially fixed coordinate system, $\dot{\alpha}$=vehicle course angle velocity, $\dot{\psi}$=yaw rate and $\dot{\beta}$=drift angular velocity. The angles on the horizontal plane, for example $\dot{\psi}$ or $\dot{\beta}$ or $\dot{\alpha}$, are illustrated in more detail in FIG. 11.

FIG. 6 shows the relationship between the lateral dynamics and the roll angle of the watercraft.

The centrifugal force $F_F$, which corresponds to the lateral acceleration, attempts to move the watercraft to the outside of the turn. An equilibrium in the lateral direction can be achieved only by a lateral force $F_Q$ acting on the watercraft from water and of the same magnitude:

$$F_Q = F_F = m\alpha_Q \approx mV\dot{\psi} \tag{21}$$

The watercraft is in equilibrium in the Z0 direction when the buoyancy force $F_A$ has the same magnitude as the force of gravity $F_G = gm$ on the boat. In this case, g is the acceleration due to the earth's gravity, m is the mass. The buoyancy force $F_A$ could produce a virtual vertical acceleration $\alpha_v$, if the force of gravity were not present.

Figure 7:
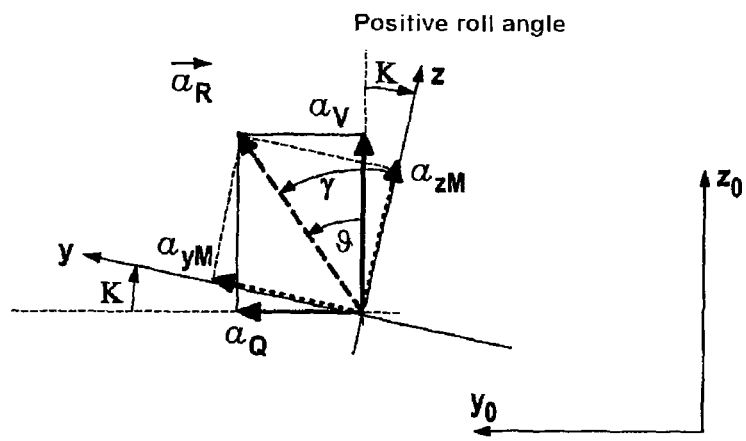
FIG. 7 shows an illustration of the relationship between the roll angle and the accelerations.
Figure 8:
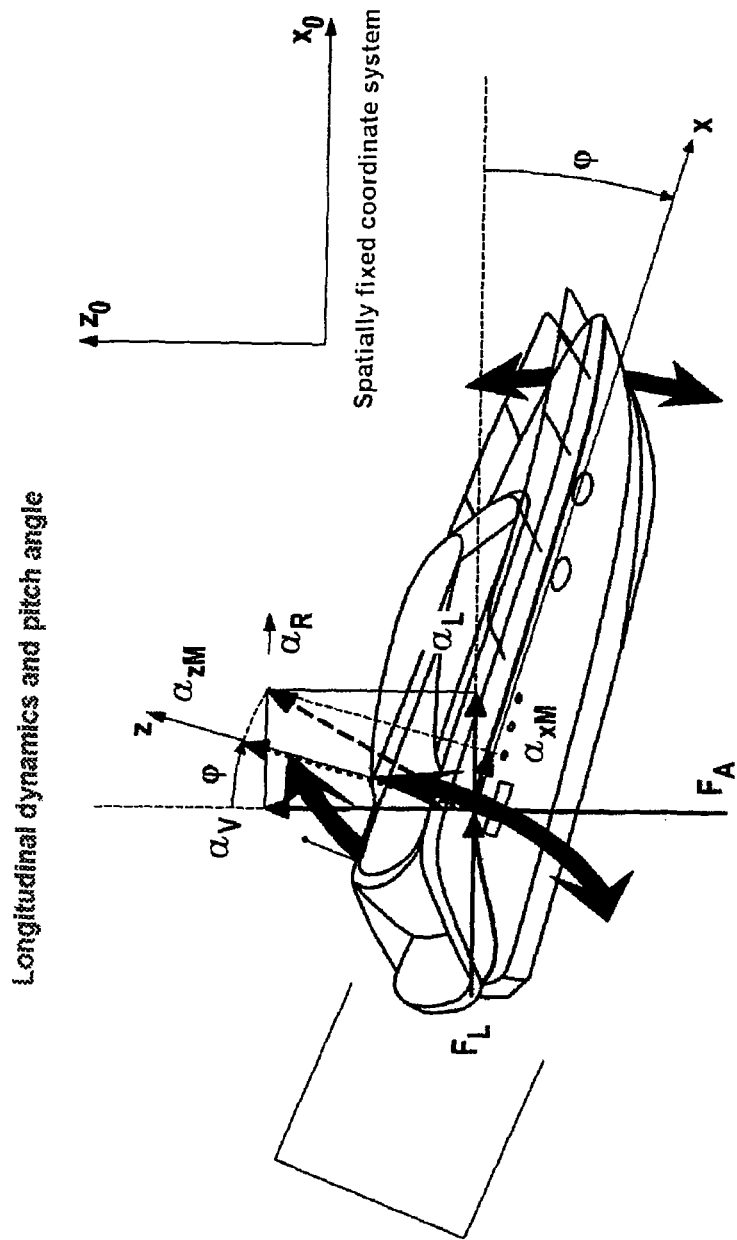
FIG. 8 shows an illustration of the relationship between the longitudinal dynamics and the pitch angle.

If the watercraft 10 had no roll angle ($\kappa = 0$), then the acceleration $\alpha_{yM}$ measured by the sensors 18 would be identical to the centripetal acceleration $\alpha_Q$ produced by the lateral force $F_Q$, and the acceleration $\alpha_{zM}$ would be identical to the vertical acceleration $\alpha_v$ produced by the buoyancy force $F_A$. If the watercraft 10 has a roll angle ($\kappa \neq 0$), then this results in the following relationship, as illustrated in FIG. 7, between the measured accelerations and the lateral acceleration $\alpha_Q$, as well as the virtual vertical acceleration $\alpha_v$:

$$\alpha_{yM} = (\alpha_Q \cos\kappa + \alpha_v \sin\kappa)$$

$$\alpha_{zM} = (\alpha_Q \sin\kappa + \alpha_v \cos\kappa) \tag{22}$$

If the vertical movement of the watercraft 10 were to be ignored, then $\alpha_v = g$. Then:

$$\kappa = \gamma - \vartheta \tag{23}$$
$$= \arcsin\frac{\alpha_{yM}}{\sqrt{g^2 + \alpha_Q^2}} \arcsin\frac{\alpha_Q}{\sqrt{g^2 + \alpha_Q^2}} \approx \frac{\alpha_{yM} - \alpha_Q}{\sqrt{g^2 + \alpha_Q^2}}$$

$$\alpha_Q = V\dot{\psi}$$

If the vertical movement of the boat is considered in detail, then:

$$\alpha_Q = (\alpha_{yM}\cos\kappa - \alpha_{zM}\sin\kappa) \tag{24}$$

$$\kappa = \gamma - \vartheta \tag{25}$$
$$= \arcsin\frac{\alpha_{yM}}{\sqrt{\alpha_{zM}^2 + \alpha_{yM}^2}} \arcsin\frac{\alpha_Q}{\sqrt{\alpha_{zM}^2 + \alpha_{yM}^2}} \approx \frac{\alpha_{yM} - \alpha_Q}{\sqrt{\alpha_{zM}^2 + \alpha_{yM}^2}}$$

If the lateral acceleration is small:

$$|\alpha_Q| \ll g, \sqrt{g^2 + \alpha_Q^2} \approx g \tag{26}$$

$$\kappa \approx \frac{\alpha_{yM} - \alpha_Q}{g}$$

3.2 Pitch Angle of the Watercraft (Pitch Angle, Trim Angle)

The pitch angle of the watercraft cannot be detected directly, in precisely the same way as the roll, angle. When traveling straight ahead, the external forces acting on the boat and the corresponding accelerations can be broken down and illustrated on the XZ plane. When moving forwards, there is a propulsion force or longitudinal force $F_L$, which acts in the X0 direction on the watercraft and produces a longitudinal acceleration $\alpha_L$. In addition, a buoyancy force $F_A$ acts on the boat, pointing in the Z0 direction and compensating in particular for the force of gravity on the watercraft. Without the force of gravity, the buoyancy force $F_A$ would produce a virtual vertical acceleration $\alpha_v$.

Figure 9:
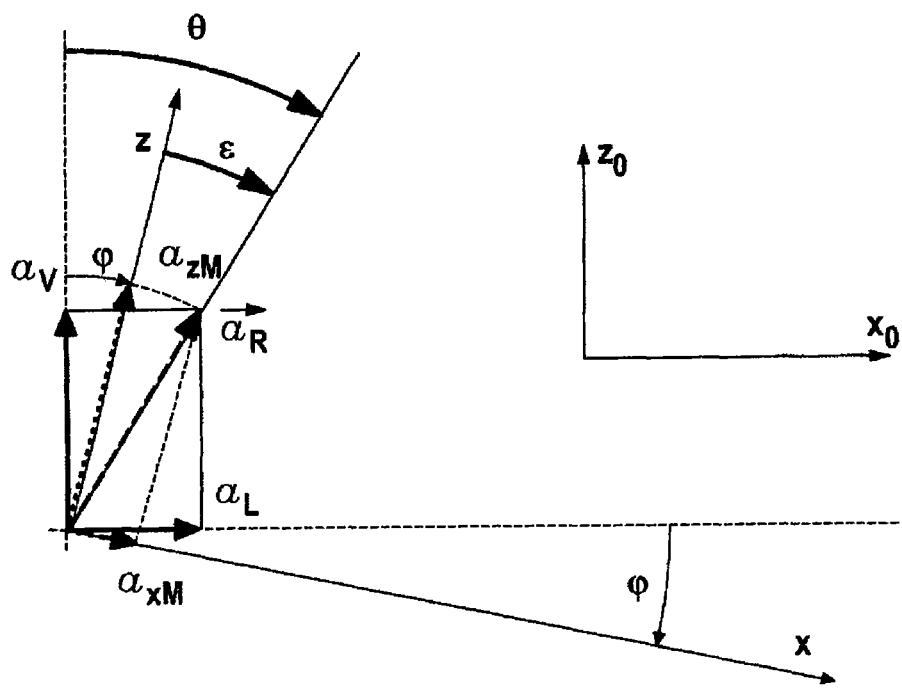
FIG. 9 shows an illustration of the relationship between the pitch angle and the accelerations.

If the watercraft had no pitch angle ($\phi=0$), then the acceleration $\alpha_{xM}$ measured by the sensors 18 would be identical to the longitudinal acceleration $\alpha_L$ produced by the longitudinal force $F_L$, and the acceleration $\alpha_{zM}$ would be identical to the vertical acceleration $\alpha_v$ produced by the buoyancy force $F_A$. If the boat has a pitch angle ($\phi \neq 0$), then this results in the following relationship, as illustrated in FIG. 9, between the measured accelerations and the actual longitudinal acceleration $\alpha_L$, as well as the virtual vertical acceleration $\alpha_v$:

$$\alpha_{xM} = (\alpha_L \cos\phi - \alpha_v \sin\phi)$$

$$\alpha_{xM} = (\alpha_L \sin\phi - \alpha_v \cos\phi) \tag{27}$$

If the vertical movement of the watercraft were to be ignored, then $\alpha_v = g$. Then:

$$\varphi = \theta - \varepsilon = \arcsin\frac{\alpha_L}{\sqrt{g^2 + \alpha_L^2}} \arcsin\frac{\alpha_{xM}}{\sqrt{g^2 + \alpha_L^2}} \approx \frac{\alpha_L - \alpha_{xM}}{\sqrt{g^2 + \alpha_L^2}} \tag{28}$$

$$\alpha_L = \dot{V}$$

If the vertical movement of the watercraft is considered in detail, then:

$$\alpha_L = (\alpha_{xM}\cos\varphi + \alpha_{zM}\sin\varphi) \tag{29}$$

$$\varphi = \theta - \varepsilon \tag{30}$$
$$= \arcsin\frac{\alpha_L}{\sqrt{\alpha_{xM}^2 + \alpha_{zM}^2}} \arcsin\frac{\alpha_{xM}}{\sqrt{\alpha_{xM}^2 + \alpha_{zM}^2}} \approx \frac{\alpha_L - \alpha_{xM}}{\sqrt{\alpha_{xM}^2 + \alpha_{zM}^2}}$$

If the longitudinal acceleration is small:

$$|\alpha_L| \ll g, \sqrt{g^2 + \alpha_L^2} \approx g \tag{31}$$

$$\varphi \approx \frac{\alpha_L - \alpha_{xM}}{g}$$

4. Circuit Diagram of the Closed-Loop Control of the Watercraft

Figure 10:
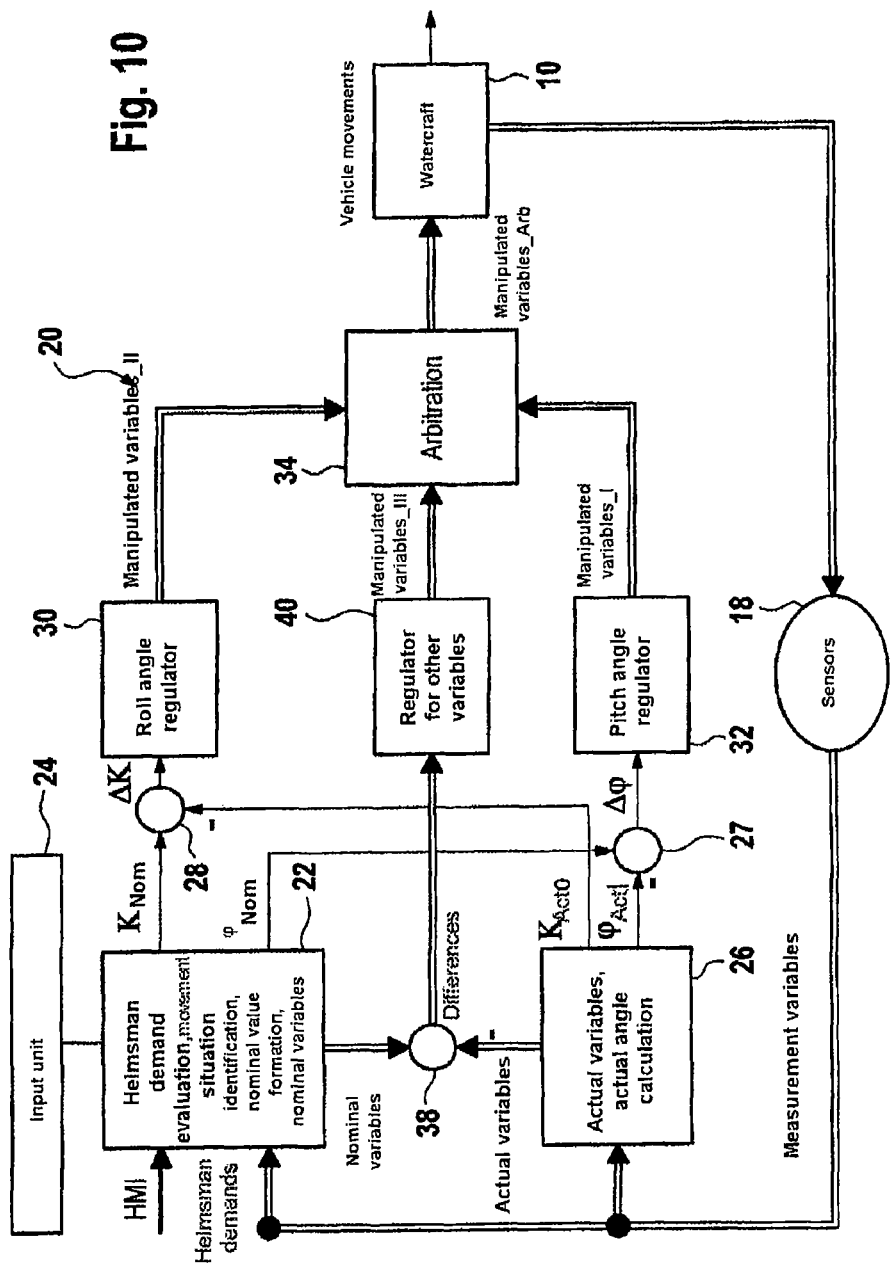
FIG. 10 shows a block diagram of the regulator for watercraft closed-loop control.

FIG. 10 shows an electronic regulator 20 which is connected to the sensors 18 in the watercraft 10. The sensors 18 may be the acceleration, rate and velocity sensors mentioned in Section 3, which are associated with the vehicle-fixed coordinate system x-y-z. The sensors 18 determine the three acceleration components $\alpha_{xM}$, $\alpha_{yM}$, $\alpha_{zM}$ and the three angular velocities about the x, y and z axes. These are the roll rate $\dot{\kappa}$, pitch rate $\dot{\phi}$ or yaw rate $\dot{\psi}$. These control variables are passed to the regulator 20 in order to determine the watercraft movements, specifically the roll angle and pitch angle. Furthermore, additional sensors 18 or models for water depth detection, such as echo sounding, or pitch sensors, GPS, and the like and sensors 18 for identification of the helmsman's demand, such as steering angle sensors, sensors for determination of rate, velocity and acceleration presets by the helmsman and the like can be provided. Furthermore, sensors or models may be provided which determine the water depth, the fuel flow rate, the engine rotation speed, the rotation velocity of a paddle wheel or the engine torque. The regulator 20 has a first evaluation unit 22 for identification of the helmsman's demand. This first evaluation unit 22 is connected to an input unit 24, by means of which freely variable application-specific movement programs can be set by the helmsman or operator. Movement programs that may be set on the input unit 24 via a keyboard or a switch, and/or wirelessly via a remote control include HARBOR, a maneuvering aid in very confined spaces; TROLL, a reduction in the minimum possible speed, a closed-loop compensation control system for waves from astern during stopping maneuvers; ECO, movement with maximum fuel efficiency, which can also be selected in addition to other movement programs; CRUISING, a cruise control system for most economical cruising; SKI, a movement program with a flat stern wave in which the velocity can be stored; WAVE, a movement program with a high stern wave in which the velocity can be stored. The helmsman presets by means of the movement programs via the man-machine interface and/or the direct presets by the helmsman by operations on the control element, such as the steering wheel, gas pedal, and/or the signals of the sensors 18, are evaluated in the evaluation unit 22 with regard to the movement situations, and the nominal variables, for example fuel flow, engine rotation speed and the like, are supplied to the comparison unit 38. The signals from the sensors 18 are supplied from the second evaluation unit 26, which is connected to the sensors 18, to the comparison unit 38 as actual variables, or after actual value calculation in a model. The nominal/actual discrepancies are determined in a regulator 40 as manipulated variables III for the actuators of the watercraft 10, and are made available to the arbitration block 34, in which the final manipulated variables are determined.

The method of operation of the regulator 20 will be described in more detail in the following text with reference to the determination of manipulated variables I, II from the roll and pitch angles.

The nominal roll angle and the nominal pitch angle are determined in the first evaluation unit 22. The actual variables, that is to say the actual roll angle and the actual pitch angle, are calculated from the sensor values using equation (25) and equation (39) in the second evaluation unit 26, which is supplied with the measured values from the sensors 18 as input variables. The respective discrepancies $\Delta\kappa$ and $\Delta\phi$ are determined via a respective comparison unit 27, 28 from the nominal and actual roll angles $\kappa_{Nom}$, $\kappa_{Act}$ and the nominal and actual pitch angles $\phi_{Nom}$, $\phi_{Act}$. The output signal $\Delta\kappa$ is supplied to the roll angle regulator 30, and the output signal $\Delta\phi$ is supplied to the pitch angle regulator 32, as input variables. The roll angle regulator 30 uses the roll angle discrepancy $\Delta\kappa$ to calculate the corresponding manipulated variables II, for example in order to control the position of the trimming flaps 16, 17 and the like. The pitch angle regulator 32 uses the pitch angle discrepancy $\Delta\phi$ to calculate its own manipulated variables I for controlling, for example, the position of the trimming flaps 16, 17 and/or the pitch angle of the power trim 15, etc. The final manipulated variables for controlling the actuating elements of the actuators are calculated from the two groups of manipulated variables I, II in the arbitration block 34, which is connected to the roll angle regulator 30 and to the pitch angle regulator 32. The actuating elements, for example hydraulic cylinders or electric motors, set these arbitrated manipulated variables of the actuators 15, 16, 17. This acts directly on the watercraft, and influences the vehicle movements. The vehicle movement variables and the helmsman's demands are detected by the sensors 18, and are fed back.

The nominal values, i.e. the different demands of the helmsman, regulations, movement programs can advantageously be preset by the helmsman. It is also possible to change the preset nominal values for the closed-loop control, during operation.

For fault identification reasons, all the calculations of the automatic regulator 20 are carried out redundantly and simultaneously on two processor cores, and are compared with one another. If a discrepancy is found between the two calculations, no control action is taken. Furthermore, the acceleration and rotation rate signals can be subjected to a plausibility check (faulty sensor signals can be identified).

5. Functional Scope

The regulator 20 is preferably a modular design and contains function modules which can be combined independently of one another, or building on one another, as a function of the sensors 18 in the watercraft 10 and the programs for calculation of input and/or output variables, as well as the actuators.

By way of example, the regulator 20 may have the following function modules:

Basic Module 1a: Watercraft, Only with Power Trim Controller 15
  longitudinal trim control when moving straight ahead
  thrust force maximization when moving straight ahead
  shallow water propulsion protection control
Basic Module 1b: Watercraft, Only with Trimming Flap Controllers 16, 17
  heel compensation when moving straight ahead
  lateral trim control (lateral-force-reduced) when turning
  yaw compensation when creeping straight ahead
Extension Module 2: Watercraft with Power Trim 15 and Trimming Flap Controllers 16, 17
  longitudinal trim control when turning
  thrust force maximization when turning
  rough water compensation control
  load compensation during towing maneuvers on one side
  HARBOR (maneuvering aid in a very confined space)
  TROLL (reduction in the minimum possible speed)
Extension Module 3: Watercraft with Additional Engine Torque Controller
  stern wave compensation control during stopping maneuvers
  ECO (all functions for maximum fuel efficiency)
  CRUISING (cruise control for most economical cruising)
  SKI (small stern wave/velocity storable)
  WAVE (high stern wave/velocity storable)

5.1 Control Methods

5.1.1 Longitudinal Trim Control when Moving Straight Ahead or when Turning The regulator 20 carries out automatic longitudinal trim control when moving straight ahead or when turning, which influences the pitch angle $\phi$ of the watercraft 10 such that the watercraft 10 moves in the direction of travel at an optimum pitch angle $\phi$ with respect to the water surface in accordance with hydrodynamic laws, in order to exploit the more economical gliding movement as quickly and permanently as possible.

Figure 11:
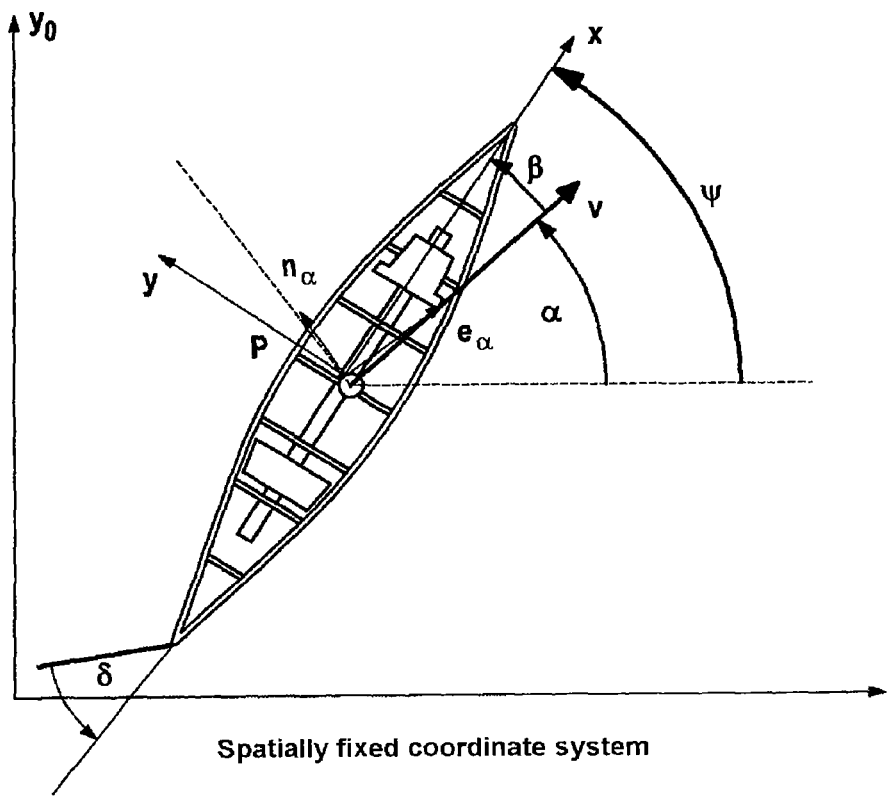
FIG. 11 shows an illustration of the angles on the horizontal plane.

The regulator 20 is supplied as input variables with the signals from the sensors and/or the models for the longitudinal and vertical acceleration $\alpha_{xM}$, $\alpha_{zM}$ as well as the yaw rate $\dot{\psi}$ (yaw angular velocity) and the velocity V of the watercraft 10 for longitudinal trim control when moving straight ahead, and in addition with the signals for the lateral acceleration $\alpha_{yM}$ for longitudinal trim control when turning. The vessel is moving straight ahead when the movement situation identification 22 determines that the signals $\dot{\psi}$ of the yaw rate sensor 18 are within a tolerance band, formed on the basis of limit values with different mathematical signs, about the zero value (zero crossing). Turning occurs when the movement situation identification 22 determines that the values are outside the tolerance band after comparison of the signals from the yaw rate sensor 18 with the limit values of the tolerance band. The mathematical signs of the signals in this case indicate whether the watercraft 10 is turning to port or to starboard. A yaw rate sensor measures the rotation about the Z axis (FIGS. 3, 11). When straight-ahead movement is found, the helmsman demand evaluation 22 determines the nominal pitch angle $\phi_{Nom}$, this is compared in the comparison unit 27 with the calculated actual pitch angle $\phi$, and the nominal/actual discrepancy is made available to the pitch angle regulator 32. This uses the discrepancy to determine the manipulated variable I for control of the longitudinal trimming devices, such as the power trim 15.

When the movement situation identification 22 identifies that the vessel is turning, the roll angle discrepancy $\kappa$ is also determined in the comparison unit 28, and the final manipulated variables for longitudinal stability are determined in the arbitration block 34 from the two manipulated variables I, II determined in the pitch and roll angle regulators 30, 32. The longitudinal and lateral trimming devices, such as the power trim 15 and the trimming flaps 16, 17, are set by means of the final manipulated variables. The setting process is carried out such that this results in the best-possible combination of the longitudinal and vertical accelerations, determined by means of acceleration sensors 18, when moving straight ahead, and longitudinal, lateral and vertical accelerations when turning, as a function of the velocity v. The velocity can be determined by means of a velocity sensor, such as a rotation speed sensor, GPS and the like.

In order to shorten the reaction time of the regulator 20 and in order to reduce the number and amplitude of the control cycles for the actuating devices 15, 16, 17 to a minimum, a supporting movement dynamics model (software) is possible, based on further input signals from which the pitch rate and the engine rotation speed when moving straight ahead, or the pitch rate and roll rate as well as the engine rotation speed, can be determined.

In order to maximize the efficiency of the movement-dynamic action, it is possible to include further actuating devices, such as the trimming flaps 16, 17 when moving straight ahead and an engine torque controller when turning.

The longitudinal trim control achieves the following advantages:
Unsecured occupants and/or objects falling or going overboard. Less fuel consumption as a result of faster entry to the gliding phase. Restricted view during the starting phase. Restricted controllability in the transitional phase. Improved acceleration and higher velocity.

5.1.2 Heel Compensation when Moving Straight Ahead

The regulator 20 controls automatic heel compensation when moving straight ahead, influencing the roll angle $\kappa$ of the watercraft 10 such that the watercraft 10 always moves parallel to the water surface, and follows the predetermined course in the longitudinal direction.

The regulator 20 is supplied with the signals from the sensors and/or the models for the longitudinal, lateral and vertical acceleration $\alpha_{xM}, \alpha_{yM}, \alpha_{zM}$ as well as the yaw rate $\dot{\psi}$ (yaw angular velocity) and the movement velocity V of the watercraft 10 for longitudinal trim control when moving straight ahead. Movement straight ahead is identified, corresponding to the description in 5.1.1, on the basis of the output signals from the yaw rate sensor 18. This movement occurs when the measured yaw rate $\dot{\psi}$ is within a tolerance band about the zero crossing. If the watercraft 10 is in this case moving at a velocity V greater than creeping speed, in particular greater than 3 km/h, the helmsman demand evaluation 22 determines the nominal roll angle $\kappa_{Nom}$, which is compared in the comparison unit 28 with the calculated actual roll angle $\kappa$, and the nominal/actual discrepancy is made available to the roll angle regulator 30, which uses the discrepancy to determine the manipulated variable I for controlling the lateral trimming devices, such as the trimming flaps 16, 17, and makes this manipulated variable I available to the arbitration block 34, which uses the determined manipulated variable I and possibly further manipulated variables III to determine the final manipulated variables for lateral stability. The lateral stability is then set by means of the existing lateral trimming devices, such as trimming flaps 16, 17, so as to minimize the lateral acceleration $\alpha_{yM}$ relative to the watercraft 10.

In order to shorten the reaction time of the system and in order to reduce to a minimum the number and amplitude of the control cycles for the actuating devices (life), a supporting movement dynamics model (software) is possible, based on further input signals from which a roll rate and the engine rotation speed can be determined.

In order to maximize the efficiency of the movement-dynamic action, it is possible to include further actuating devices, such as a power trim 15.

The heel compensation achieves the following advantages:
Unsecured occupants of the watercraft falling or going overboard (for example by a tilting/pitching movement of the vehicle);
Loss of unsecured objects by falling overboard (for example during heeling);
Propulsion damage by detection of lost objects
Inadvertent own steering inclination necessitates permanent steering correction (for example loading on one side)

5.1.3 Lateral Trim Control (Lateral-Force-Reduced) when Turning

The regulator 20 carries out automatic lateral trim control, which influences the boat inclination when turning such that the occupant can turn without any lateral force. Turning without any lateral force means that the roll angle $\kappa$ is set to be free of lateral force.

The regulator 20 is supplied with the signals from the sensors and/or the models for the longitudinal, lateral and vertical acceleration $\alpha_{xM}, \alpha_{yM}, \alpha_{zM}$ as well as the yaw rate $\dot{\psi}$ (yaw angular velocity) and the movement velocity V of the watercraft 10 for lateral trim control when turning. Turning is identified, corresponding to the description in 5.1.1, on the basis of the output signals from the yaw rate sensor 18. This situation occurs when the measured yaw rate $\dot{\psi}$ is outside a tolerance band around the zero crossing. The helmsman demand evaluation 22 then determines the nominal roll angle $\kappa_{Nom}$ without any lateral force, which is compared in the comparison unit 28 with the calculated actual roll angle $\kappa$, and the nominal/actual discrepancy is made available to the roll angle regulator 30, which uses the discrepancy to determine the manipulated variable I for controlling the lateral trimming devices, such as the trimming flaps 16, 17, and makes this manipulated variable I available to the arbitration block 34, which uses the determined manipulated variable I and possibly further manipulated variables III to determine the final manipulated variables for lateral stability. The lateral stability is then set by means of the existing lateral trimming devices, such as trimming flaps 16, 17, so as to minimize the lateral acceleration $\alpha_{yM}$ relative to the watercraft 10.

In order to shorten the reaction time of the system and in order to reduce to a minimum the number and amplitude of the control cycles for the actuating devices, a supporting movement dynamics model (software) is possible, based on further input signals, which represent the roll rate, velocity and engine rotation speed.

In order to maximize the efficiency of the movement-dynamic action, it is possible to include further actuating devices, such as power trim and engine torque controllers.

The lateral trim control achieves the following advantages:
Scratching/tearing/leakages of upholstery/floors/side walls caused by moving, unsecured objects (for example anchor, bottles)
Loss of unsecured objects by falling overboard
Propulsion damage by detection of lost objects
Dirt to clothing/inventory items by liquids running out (for example fuel, cleaning agents, drinks)
Unsecured occupants of the watercraft falling/being injured/going overboard
Body injuries caused by moving unsecured objects (for example anchor, tool, water ski/wakeboard)
Sufficiently large number of supporting/holding apparatuses required
All occupants of the watercraft must pay attention at all times (for example no people/children sleeping)

5.1.4 Thrust Force Maximization when Moving Straight Ahead and when Turning

The regulator 20 carries out automatic thrust force monitoring when moving straight ahead and when turning, with combined control, which identifies so-called propeller running in air of the longitudinal propulsion unit 23 and influences the power flow of the propeller in the water during movement such that the best possible efficiency is ensured at all times at the longitudinal propulsion unit/water power transmission point, thus also avoiding damage to the watercraft 10 and propulsion unit 23 as a result of rotation speed fluctuations/peaks.

The regulator 20 is supplied with the signals from the sensors 18 or the models, which are not described in any more detail, which represent the yaw rate, the relative vehicle velocity with respect to the water surface (paddle wheel, ram pressure gauge) and the engine rotation speed. Moving straight ahead or turning is identified by evaluation of the yaw rate from the yaw rate sensor. The signals provided by the sensors 18 or models, for the relative vehicle velocity and the engine rotation speed, are used to monitor the slip behavior between the longitudinal propulsion unit 23 and the water surface when moving straight ahead. When turning, the lateral, longitudinal and vertical accelerations $\alpha_{xM}, \alpha_{yM}, \alpha_{zM}$, as measured by the sensors 18, are also determined and, using equation (25), the actual roll variable $\psi_{Act}$ determined in the second evaluation unit 26, or its discrepancy as determined in the comparison unit 38, of the longitudinal propulsion unit 23 with respect to the water surface is used to monitor the slip behavior. The slip behavior determined in this way is used to set the power flow by means of the existing longitudinal trimming devices 15 when moving straight ahead, and the longitudinal and lateral trimming devices 15, 16, 17 so as to achieve the least possible slip, that is to say discrepancy between the relative vehicle velocity and the associated engine rotation speed. The engine rotation speed is proportional to the rotation speed of the propeller.

In order to shorten the reaction time of the system and in order to reduce the number and amplitude of the control cycles for the actuating devices to a minimum, a supporting movement dynamics model (software) is possible, based on further input signals which represent the longitudinal acceleration.

In order to maximize the efficiency of the movement-dynamic action, it is possible to include further actuating devices, such as an engine torque controller.

Thrust force maximization achieves the following advantages:
Drive damage caused by rotation speed peaks of the engine
Risk of so-called "softening" of the outboard level by power flow fluctuations (for example resulting from frequent, sudden loads of the level when under load)
Pitching of the body of the watercraft in conjunction with the sea state
Propeller running in air (for example as a result of inadequate immersion depth/incorrect trimming angle)

5.1.5 Shallow Water Propulsion Protection Control

The regulator 20 carries out automatic water depth monitoring during displacement movement with combined propulsion protection control which is intended to identify and prevent the longitudinal propulsion unit 23 from grounding, with as predictive a response as possible.

The regulator 20 is supplied with the signals from sensors 18 or models, which represent the absolute and spatially fixed vehicle velocity V of the watercraft 10. Depending on the vehicle velocity of the watercraft 10, the movement situation identification 22 of the regulator 20 identifies the movement situation of displacement movement, which is a lower level of gliding movement. On the basis of the monitored water depth profile, which is determined by sensors 18 such as echo sounding or is calculated in a model, the vehicle velocity V and the known trimming position of the longitudinal propulsion unit 15 are implemented on the basis of a nominal/actual depth prediction and the existing longitudinal trimming device or devices 23, the power trim 15, are used to set the immersion depth of the longitudinal propulsion unit 23 so as to prevent grounding.

In order to shorten the reaction time of the system and in order to reduce the number and amplitude of the control cycles for the actuating devices to a minimum, a supporting movement dynamics model (software) is possible, based on further input signals, such as the engine rotation speeds.

In order to maximize the efficiency of the movement-dynamic action, it is possible to include further actuating devices, such as an engine torque controller.

The shallow water propulsion protection control achieves the following advantages:
Drive damage caused by grounding is prevented.
Propeller running in air when the immersion depth is too shallow (for example too much fuel with the longitudinal propulsion unit trimmed up).

5.1.6 Rough Water Compensation Control

The regulator 20 carries out automatic compensation control for rough water movement (sea state), which influences the pitch angle $\phi$ and the roll angle $\kappa$ of the watercraft 10 such that the watercraft 10 is stabilized in a best-possible attitude, on the basis of hydrodynamic laws, with respect to a water surface with waves, in order to continue movement as safely and comfortably as possible in the direction of movement.

The regulator 20 is supplied with the signals from the sensors 18 or the models for the longitudinal, lateral and vertical acceleration $\alpha_{xM}$, $\alpha_{yM}$, $\alpha_{zM}$, the yaw rate $\dot{\phi}$, the spatially fixed vehicle velocity of the watercraft 10 and the engine rotation speed of the longitudinal propulsion unit 23. The movement situation identification 22 of the regulator 20 determines the movement situation of rough water movement as a function of the vehicle velocity V and the engine rotation speed. For this purpose, an increased propulsion slip in conjunction with superimposed rotation rates as shown by the arrows 11, 12, 19 for the pitch, roll and yaw angles 13, 14, 21 is determined on the basis of the discrepancies between the spatially fixed vehicle velocity of the watercraft 10 and the velocity calculated from the engine rotation speeds. On the basis of the determined propulsion slip and the rotation rates, the longitudinal stability and lateral stability are ensured by dynamic opposing control processes (compensation) by means of the existing longitudinal and lateral trimming devices, that is to say the trimming flaps 16, 17 and the power trim 15, so as to achieve the minimum possible effect on the longitudinal, lateral and vertical movements of the watercraft 10, as a function of the velocity. This prevents pitching of the watercraft.

In order to shorten the reaction time of the system and in order to reduce the number and amplitude of the control cycles for the actuating devices to a minimum, a supporting movement dynamics model (software) is possible, based on further input signals, such as the longitudinal, lateral and vertical accelerations.

In order to maximize the efficiency of the movement-dynamic action, it is possible to include further actuating devices, such as an engine torque controller.

The rough water compensation control achieves the following advantages:
Unsecured occupants of the watercraft/objects falling/going overboard.
Restricted view as a result of a poor incidence angle with respect to the wave
Restricted course maintenance capability owing to crosswaves.

5.1.7 Yaw Compensation when Creeping Straight Ahead

The regulator 20 carries out automatic yaw moment control when moving slowly straight ahead, which influences the rolling, which is typical of a gliding boat, when moving slowly, such that the watercraft follows the helmsman's demand without any further steering correction. For this purpose, the trimming flaps 16, 17 are operated alternately to the port and starboard, in order to assist the straight-ahead movement.

The regulator 20 is supplied with the signals from the sensors 18 or the model, which represent the velocity and the yaw angle rate (yaw rate) of the watercraft 10. The regulator 20 determines the movement situation of moving slowly straight ahead as a function of the velocity and the yaw rate. When the watercraft 10 is carrying out alternating yaw movements, that is to say when the watercraft 10 is not moving straight ahead as a result of rotation about the Z axis, the lateral stability is produced again by means of the existing lateral trimming devices, such as the trimming flaps 16, 17, by dynamic opposing control (compensation), so as to achieve the minimum possible yaw rate.

In order to shorten the reaction time of the system and in order to reduce the number and amplitude of the control cycles for the actuating devices to a minimum, a supporting movement dynamics model (software) is possible, based on further input signals, such as the roll rate and the engine rotation speed.

In order to maximize the efficiency of the movement-dynamic action, it is possible to include further actuating devices, such as the power trim.

The yaw compensation when moving slowly straight ahead achieves the following advantages:
Avoidance of inadvertent self-steering inclination, which otherwise necessitates permanent steering correction (for example when moving slowly (channel), heeling).

5.1.8 Stern Wave Compensation Control During Stopping Maneuvers

The regulator 20 carries out automatic stern wave compensation control during stopping maneuvers, which compensates for the stopping process, which is critical in the case of gliding boats, from gliding movement in conjunction with the immersion of the hull and the stern wave striking from the rear, such that the wave does not roll over the watercraft 10 from the stern, nor is the watercraft 10 turned by the wave (knocked sideways).

The regulator 20 is supplied with the signals from the sensors 18 and/or the models, which represent the relative vehicle velocity with respect to the water surface and the longitudinal acceleration of the watercraft 10, and the engine rotation speed of the longitudinal propulsion unit 23. The movement situation identification 22 determines the stopping maneuver movement situation as a function of the vehicle velocity, the longitudinal acceleration and the engine rotation speed. A stern wave prediction (wavelength/amplitude) is produced on the basis of the previous gliding movement velocity, and a propulsion thrust is initiated automatically by means of the existing longitudinal propulsion unit 23, the engine torque controller, when the stern wave strikes, such that the watercraft 10 carries out a stabilizing longitudinal movement during the passage of the stern wave, thus reducing the relative velocity between the watercraft and the wave arriving from astern.

In order to shorten the reaction time of the system and in order to reduce the number and amplitude of the control cycles for the actuating devices to a minimum, a supporting movement dynamics model (software) is possible, based on further input signals, such as the vertical acceleration, the pitch rate and the yaw rate.

In order to maximize the efficiency of the movement-dynamic action, it is possible to include further actuating devices, such as the power trim and the trimming flaps.

The stern wave compensation controller during stopping maneuvers achieves the following advantages:
Water inadvertently flowing over (for example an impacting stern wave)
Risk of the watercraft capsizing and being knocked sideways/ knocked over.

5.1.9 Load Compensation During (Single-Sided) Towing Maneuvers

The regulator 20 carries out automatic load compensation control during (single-sided) towing maneuvers which influence the "mismatch" of the towing vessel with respect to course maintenance, water attitude and fuel consumption, such that the watercraft 10 can be controlled safely at all times, and follows the predetermined course.

The regulator 20 is supplied with the signals from the sensors 18 and/or the models for the longitudinal, lateral and vertical acceleration $\alpha_{xM}$, $\alpha_{yM}$, $\alpha_{zM}$ and the yaw rate $\dot{\psi}$ (yaw angular velocity), the engine rotation speed of the longitudinal propulsion unit 23 and the velocity of movement V of the watercraft 10 for load compensation during (single-sided) towing maneuvers. The propulsion slip is determined as a function of the relative vehicle velocity and the engine rotation speed, a low velocity of movement is determined by means of the vehicle velocity signal, and a mismatched water attitude is determined as a function of the lateral acceleration and the yaw rate. The movement situation identification 22 determines the towing operation movement situation on the basis of the propulsion slip, which indicates that the watercraft is being operated on high load, the low movement velocity and the mismatched water attitude. When this situation occurs, the movement stability is set by using the determined manipulated variables to control the existing longitudinal and lateral trimming devices, the power trim 15 and the trimming flaps 16, 17, so as to achieve the best possible water attitude with respect to the yaw rate and the lateral acceleration with respect to the stability nominal values. For this purpose, the arbitration block 34 is supplied with the manipulated variables I, II, III determined in the regulators 30, 32, 40.

In order to shorten the reaction time of the system and in order to reduce the number and amplitude of the control cycles for the actuating devices to a minimum, a supporting movement dynamics model (software) is possible, based on further input signals, such as the roll rate and the fuel consumption.

In order to maximize the efficiency of the movement-dynamic action, it is possible to include further actuating devices, such as the engine torque controller.

The load compensation during (single-sided) towing maneuvers achieves the following advantages:
Unsecured occupants falling/going overboard (for example as a result of a pitching movement of the watercraft)
Loss of unsecured objects by falling overboard (for example during heeling)
Inadvertent self-steering inclination (for example single-sided load)

6. Movement Programs

6.1 Movement Programs in Parallel Operation

The input unit 24 of the electronic regulator 20 is used to input freely variable application-specific movement programs. The movement programs can be preselected in addition to the closed-loop control processes described in Section 5, provided that they are used in the relevant watercraft 10. This results in the movement programs being operated in parallel with the closed-loop control processes. This results merely in priority switching and superimposition control.

6.1.1 ECO Mode (All Functions for Maximum Fuel Efficiency)

The input ECO on the input unit 24 of the regulator 20 leads to automatic variable-speed control for fuel efficiency improvement, which influences the closed-loop control processes described in Section 5 such that the respective control actions are carried out taking account of the best-possible fuel utilization.

After manual selection of the ECO mode on the input unit 24 and the closed-loop control process preferably identified on the basis of the input criteria, according to the description in Section 5, the respective control actions for the actuating devices described in Section 5 and the longitudinal propulsion unit 15, such as the engine torque controller, are set in the regulator 20 so as to achieve the best-possible fuel efficiency.

The ECO mode achieves the following advantages:
Reduced fuel consumption by avoidance of frequent and extreme load changes (for example acceleration, cyclic maneuvers)

6.1.2 Cruising Mode(Cruise Control for Most Economical Cruising)

The regulator 20 carries out automatic cruise control during cruising, which influences the velocity and the water attitude of the watercraft 10 such that the watercraft is always operated as economically as possible, at the highest possible cruise speed at the same time.

The regulator 20 is supplied with the signals from the sensors 18 and/or the models, which represent the velocity and the yaw rate on the watercraft 10 and the engine rotation speed as well as the fuel consumption of the longitudinal propulsion unit 15. After manual selection of the CRUISING mode on the input unit 24 and constant gliding movement having been identified on the basis of the supplied signals, the movement velocity of the watercraft 10 is set by means of the longitudinal propulsion unit, advantageously engine torque controller, in a predefined velocity tolerance band—until deactivation of the CRUISING mode—so as to achieve an optimum water attitude and velocity but with the best possible cruise comfort and fuel efficiency. The closed-loop control processes described in Section 5 still remain active, and their priority is simply reduced.

The CRUISING mode achieves the following advantages:
Permanent correction of the velocity as a function of the instantaneous consumption value (for example as a result of waves, wind). It is not necessary to know the most economical movement state of a boat (for example occasional helmsman, unfamiliar boat) stress resulting from simultaneous operation of a number of parallel systems is avoided (for example echo sounding, trimming flaps, steering).

6.1.3 SKI Mode (Small Stern Wave/Velocity Storable)

The regulator 20 carries out automatic water ski/towing boat control with preselectable intended velocity, which takes account of the particular requirements when towing a water skier, after a rapid start, a flat stern wave and a constant velocity.

The regulator 20 is supplied with the signals from the sensors 18 and/or the models, which represent the velocity of the watercraft 10 and the engine rotation speed of the longitudinal propulsion unit 15. After manual selection of the SKI mode on the input unit 24 and identification of the stored target velocity (manual, reference movement after mode activation), the movement characteristics, preferably the velocity and the engine rotation speed, of the watercraft 10 are influenced during every further water ski start/movement, by means of the longitudinal propulsion unit, preferably the engine torque controller, such that the watercraft can be operated at most at the target velocity. The target velocity can be corrected upwards/downwards during operation, in defined steps, on the input unit 24. The closed-loop control processes described in Section 5 still remain active, and just have their priority reduced.

The SKI mode achieves the following advantages:
Better protection of the boat helmsman during towing operation
Better concentration of the boat helmsman on the water skier
Reproducibility of the towing process

6.2 Movement Program in Individual Operation

The input unit 24 of the electronic regulator 20 is used to input freely variable application-specific movement programs. The movement programs can be entered only on their own, without the closed-loop control processes described in Section 5, provided that they are used in the relevant watercraft 10. The closed-loop control processes described in Section 5 must be manually deactivated, or are automatically deactivated when one of the following movement programs is entered.

6.2.1 WAVE Mode (High Stern Wave/Velocity Storable)

The regulator 20 carries out automatic wakeboard/towing boat control, which influences the incidence angle $\phi$ of the watercraft 10 when moving straight ahead such that the watercraft moves at an angle which is (hydrodynamically) as bad as possible with respect to the water surface in the direction of movement, in order to displace as much water as possible, with the large stern wave associated with this (desirable for wakeboarding!).

The regulator 20 is supplied with the signals from the sensors 18 and/or the models, which represent the yaw rate, the longitudinal and lateral acceleration and the velocity of the watercraft 10, and the engine rotation speed of the longitudinal propulsion unit 15. After manual selection of the WAVE mode on the input unit 24, the regulator 20 uses the yaw rate to determine the movement situation. Movement straight ahead and the target velocity stored in a memory (manual, reference movement after mode activation). On every further start/movement, the movement characteristics of the watercraft 10 are influenced by means of the longitudinal trimming unit, such as the power trim, as well as the longitudinal propulsion unit, such as the engine torque controller, such that the watercraft 10 creates the largest possible stern wave, with a defined propulsion slip and target velocity. The largest possible stern wave is in this case controlled as a function of the longitudinal and vertical acceleration, the propulsion slip as a function of the velocity, and the engine rotation speed and the target velocity as a function of the velocity of the watercraft 10. This limits the maximum speed during towing and can be corrected upwards/downwards during operation in defined steps on the control element.

In order to shorten the reaction time of the system and in order to reduce the number and amplitude of the control cycles for the actuating devices to a minimum, a supporting driving dynamics model (software) is possible, based on further input signals, such as the pitch rate.

In order to maximize the efficiency of the movement-dynamic action, it is possible to include further actuating devices, such as the trimming flaps.

The WAVE mode achieves the following advantages:
Reproducibility of the towing process
Avoidance of expensive special accessories

6.2.2 HARBOR Mode (Maneuvering Aid in a Very Confined Space)

The regulator 20 carries out automatic maneuvering auxiliary control when the space and weather conditions are poor, making use of the supporting steering and deceleration effect of the trimming and propulsion units in the watercraft 10, so as to assist turning and docking maneuvers as well as possible.

The regulator 20 is supplied with the signals from the sensors 18 and/or the models, which represent the velocity, the yaw rate and the roll rate of the watercraft 10, and the engine rotation speed of the longitudinal propulsion unit 15. After manual selection of the HARBOR mode on the input unit 24 and identification of speed is less than 3 km/h, an own-steering behavior, which is very restricted at low local velocities and through the lack of dynamic flow on the rudder of the watercraft 10, is assisted by means of the existing longitudinal and lateral trimming devices, such as power trim and trimming flaps, by deliberate operation (amplification) so as to achieve the best possible effect on longitudinal and lateral movements, corresponding to the helmsman's demand as determined in 22.

In order to shorten the reaction time of the system and in order to reduce the number and amplitude of the control cycles for the actuating devices to a minimum, a supporting movement dynamics model (software) is possible, based on further input signals, such as the longitudinal and lateral acceleration.

In order to maximize the efficiency of the movement-dynamic action, it is possible to include further actuating devices, such as an engine torque controller.

The HARBOR mode achieves the following advantages:
Easier docking maneuvers in a harbor
No damage to the watercraft itself, or to another watercraft
Course maintenance capability at low speeds

6.2.3 TROLL Mode (Reduction in the Lowest-Possible Speed)

The regulator 20 carries out automatic trolling auxiliary control of the required speed when moving slowly (idling, connected), which makes use of the supporting braking effect of the trimming units provided in the watercraft 10, so as to assist as well as possible the further reduction of the lowest possible speed that can be traveled at.

The regulator 20 supplied with the signals from the sensors 18 and/or the models, which represent the velocity of the watercraft 10 and the engine rotation speed of the longitudinal propulsion unit 15. After manual selection of the TROLL mode on the input unit 24, the creeping movement situation is identified in the regulator 20 on the basis of the evaluation of the velocity and the engine rotation speed. The regulator 20 brakes the watercraft 10 by operating the existing longitudinal trimming devices, such as the trimming flaps and the power trim (amplification). This operation results in an increase in the wetted hull area and, in consequence, in the movement velocity being braked as well as possible. Creeping movement is identified on the basis of the velocity and the engine rotation speed.

In order to shorten the reaction time of the system and in order to reduce the number and amplitude of the control cycles for the actuating devices to a minimum, a supporting movement dynamics model (software) is possible, based on further input signals, such as the yaw rate.

In order to maximize the efficiency of the movement-dynamic action, it is possible to include further actuating devices, such as an engine torque controller.

The TROLL mode achieves the following advantages:
Maintenance of the velocity restriction in harbors
Support of towfishes
A saving of complex trolling hardware solutions
Avoidance of continuous engagement and disengagement processes

The invention claimed is:

1. An automatic stabilization unit for watercraft comprising:
an electronic regulator that executes a closed loop control process that stabilizes a water attitude of the watercraft during movement of the watercraft, while moving straight ahead and turning, as a function of movement-situation-dependent rotation rates($\dot{\kappa},\dot{\phi},\dot{\psi}$) and longitudinal accelerations and/or lateral accelerations and/or vertical accelerations ($\alpha_{xM}, \alpha_{yM}, \alpha_{zM}$) measured by sensors including a yaw rate sensor, using lateral actuating devices of the watercraft, and
a helmsman demand detection unit that is connected to the sensors of the watercraft in order to identify a movement situation of moving straight or turning based on a signal of the yaw rate sensor,
wherein the closed-loop control process being executed by the electronic regulator depends on the movement situation identified, such that:
when the movement situation of the watercraft is identified as moving straight ahead in response to the signal from the yaw rate sensor being within a tolerance band, the lateral actuating device is actuated to reduce a roll angle of the watercraft, and
when the movement situation of the watercraft is identified as turning in response to the signal from the yaw rate sensor being outside the tolerance band, the lateral actuating device is actuated to control the roll angle of the watercraft to reduce lateral force on the watercraft.

2. The automatic stabilization unit for watercraft as claimed in claim 1, wherein the helmsman demand detection unit is configured to calculate nominal values for stabilization of the watercraft, which are compared in comparison units with actual values calculated from measured rotation rates and longitudinal accelerations and/or lateral accelerations and/or vertical accelerations to produce discrepancy signals, the discrepancy signals are supplied to a roll angle regulator and to a pitch angle regulator in order to determine manipulated variables.

3. The automatic stabilization unit for watercraft as claimed in claim 2, wherein the manipulated variables are supplied to an arbitration block which is connected to the regulators and is configured to calculate final manipulated variables for the actuating devices.

4. The automatic stabilization unit for watercraft as claimed in claim 1, wherein the actuating devices are longitudinal and lateral trimming devices and/or longitudinal and lateral propulsion units.

5. The automatic stabilization unit for watercraft as claimed in claim 1, wherein the electronic regulator has an input unit, by means of which a movement program can be set by an operator, and at least one selectable movement program controls a longitudinal propulsion unit of the watercraft.

6. The automatic stabilization unit for watercraft as claimed in claim 5, wherein the movement program includes one or more of ECO, HARBOR, TROLL, WAVE, CRUISING, SKI.

7. The automatic stabilization unit for watercraft as claimed in claim 5, wherein the electronic regulator receives further input signals which assist a helmsman in predictive operation and collision prevention.

8. The automatic stabilization unit for watercraft as claimed in claim 1, wherein optical or acoustic systems are provided in or on the watercraft, wherein output signals of the optical or acoustic systems are made available as input signals to the watercraft for channel identification and surrounding area protection.

9. The automatic stabilization unit for watercraft as claimed in claim 5, wherein the movement program deactivates at least one closed loop control process.

* * * * *